July 14, 1936.          H. C. HARRISON          2,047,733
                       CONSTANT SPEED DRIVE
                       Filed March 17, 1934
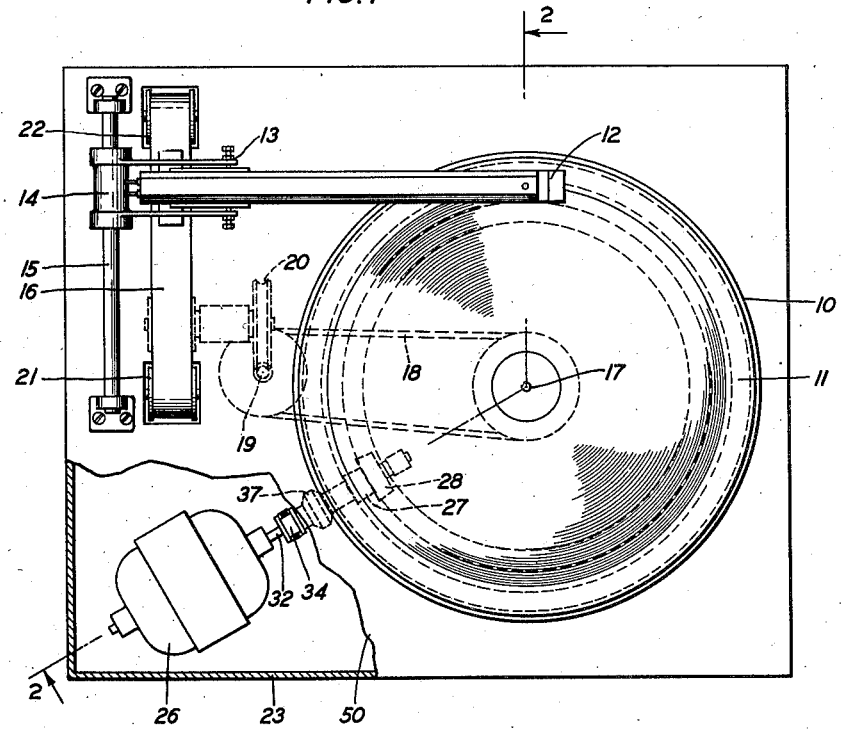
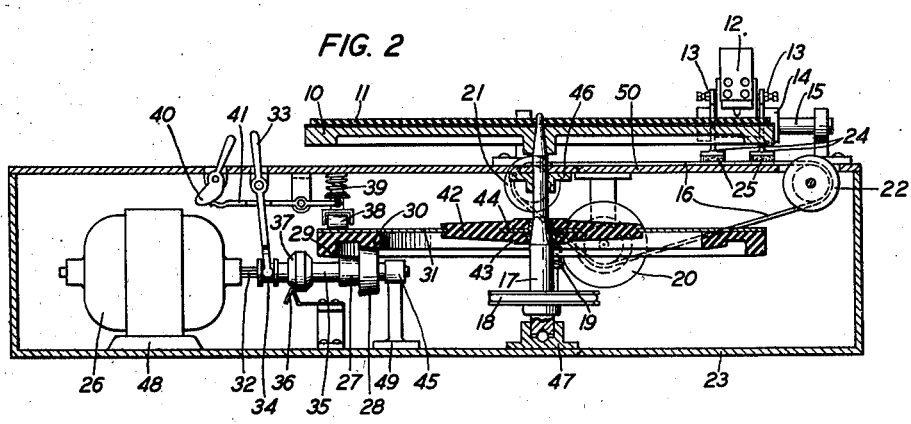
INVENTOR
H. C. HARRISON
BY
ATTORNEY Patented July 14, 1936

2,047,733

UNITED STATES PATENT OFFICE 2,047,733

CONSTANT SPEED DRIVE

Henry C. Harrison, Port Washington, N. Y., assignor to Bell Telephone Laboratories, Incorporated, New York, N. Y., a corporation of New York Application March 17, 1934, Serial No. 716,068

2 Claims. (Cl. 74—191)

This invention relates to phonograph machines and particularly to means for driving the turntable and recorder thereof.

The object of this invention is a simple and inexpensive drive for the turntable and recorder of a phonograph that will operate at an absolutely constant speed.

A feature of the invention is a means for obtaining a plurality of constant speeds for the turntable whereby records adapted to be rotated at 33⅓ revolutions per minute can be made as well as records adapted to be rotated at the usual speed of 78 revolutions per minute.

The drives usually employed for phonograph turntables comprise a motor cooperating with a speed reducing train of gears to drive the turntable shaft. Due to imperfections in the gear teeth of the train of gears, periodic changes in speed are introduced into the rotation of the turntable to result in variations in the pitch of the recorded matter. To eliminate the speed variations diverse mechanical filtering agents are usually added to the drive, each agent including, in some form or other, a yielding member, a damping medium and a flywheel. These added agents, however, are necessarily complicated and expensive and hence undesirable.

The better way of removing the irregularities in speed is to eliminate the source of the irregularities, that is, to substitute a pure rolling speed reduction mechanism for the gear train. This may be done by the use of a system of pulleys, or by friction cones, and of the two systems the latter is preferred as being the simplest and the best adapted to yield a plurality of constant speeds such as are at present desired. Even with the use of friction cones, however, constant speed will not be obtained unless the ratio of the radii of the driving and driven cones is always constant. In the cones heretofore employed a large amount of friction was obtained by covering the contacting surface of the driving cone with resilient material. Being compressible the material so located caused the radius of the cone to vary with each change in pressure and thus resulted again in a non-uniform speed in the driven member.

In the present invention the speed reduction is secured by means of a relatively small non-deformable driving cone cooperating with a large, almost disc-shaped driven cone, the contacting surface of which is covered with a layer of resilient material. Thus any pressure exerted upon the resilient surface of the large driven cone compresses the surface axially rather than radially and hence, since the driving cone is non-deformable, such pressure has no effect upon the ratio of the radii of the two cones. Two such pairs of cones are provided, with means for selecting either one, depending upon the speed of rotation desired for the turntable.

The recorder drive comprises a moving belt driven from the turntable shaft and supported throughout its operative portion by a member which is substantially non-responsive to vibrations included in the range of frequencies to be recorded. The recorder arm is mounted on a carriage adapted to engage the belt frictionally and to be driven thereby.

The features outlined above and others to be hereinafter described are shown in the accompanying drawing in which Fig. 1 is a plan view of a preferred form of drive, and Fig. 2 is an elevation in section showing the details of the turntable and recorder drive.

Referring now to Fig. 1, 10 is a heavy turntable on which is mounted a record blank 11. Cooperating with record blank 11 is a recorder 12, pivotally mounted at 13 on a carriage 14, which is adapted to move laterally along guide bar 15. The carriage 14 is propelled laterally by frictionally engaging a moving endless band 16, preferably made of tempered steel, which is driven from the turntable drive shaft 17 through a belt 18 and a worm and wormwheel 19 and 20, respectively.

The recorder feed and turntable drive are shown to better advantage in Fig. 2 in which it is seen that the endless band 16 is supported between pulleys 21 and 22 by the top 50 of cabinet 23, the top being made of such material and thickness as to have a natural frequency of vibration outside the range of frequencies to be recorded. By so designing the support for the belt, the introduction of extraneous vibrations into the recorded matter through the recorder support is prevented. The carriage 14 is driven from two depending legs 24 which terminate in pads 25 made of cork or other material having a high coefficient of friction. The total normal pressure on the pads is dependent, of course, upon the equivalent moment of the recorder arm about its pivot at the pads. For a greater pressure, guide bar 15 may be placed closer to the pads and for a lesser pressure the bar may be located farther away.

Turntable 10 is driven from a high speed motor 26, preferably of the synchronous type, through metal cones 27, 28 cooperating with rubber conical runways 29 and 30, respectively, on disc 31 which is frictionally threaded on shaft 17. The angles of runways 29 and 30 are so chosen that the apex of each lies in the center of the turntable shaft 17 and at the intersection therewith of the axis of rotation of cones 27, 28 to secure pure rolling and hence constant speed. Metal cones 27 and 28 are slidably keyed on shaft 32 of motor 26 and the position of the cones on shaft 32 is determined by forked lever 33 coacting with groove 34 in member 35, which is integral with cones 27 and 28. Cone 27 is used for the slower speed and cone 28 supplies the higher speed. Spring detent 36 cooperating with surface 37 serves to maintain the cone in the desired position with respect to runways 29 and 30. In order to maintain a constant ratio between the radii of the cones it is important that the cones do not move axially while in operation and hence spring detent 36 is made rather stiff. The runways are spaced apart a distance which is slightly greater than the width of either cone, and the space is of such dimension that the largest cone 28 does not touch any portion of the disc when cone 27 is operating on runway 29. Shaft 32 is relieved of excessive bending stresses by means of journal 45.

Disc 31 is located sufficiently high on shaft 17 so that when it is at rest runways 29 and 30 do not contact either one of cones 27 and 28. This prevents the formation of depressions in the runways by constant pressure at one point by the cone when at rest, and also provides a method whereby the rotation of the turntable may be interrupted without stopping the motor, as, for example, when the speed of the turntable is to be changed. Contact with the cone is established by depressing the edge of the disc. This is done by means of roller 38 which is urged against the upper face of disc 31 by spring 39, the tension of which is controlled by cam 40 and lever 41. To enable the edge of disc 31 to be depressed without lowering the entire disc, the central portion 42 of the disc is made of resilient material, such as rubber, reinforced by a metal bushing 43 and spider 44. In addition to permitting vertical motion of the runway, resilient portion 42 also acts as a filter for undesirable vertical vibrations of the disc. Turntable drive shaft 17 is supported in a vertical portion between upper bearing 46 and lower thrust bearing 47. Cabinet 23, to which bearings 46 and 47 are secured, may be insulated from vibrations of motor 46 by providing suitable resilient supports (not shown) for bases 48 and 49 of motor 26 and bearing 45.

The operation of the recording machine is as follows: Motor 26 is started, lever 33 is set in the position corresponding to the speed of rotation desired, say, for example, 33⅓ revolutions per minute and lever 41 is then raised to release spring 39 and thereby cause runway 30 to engage cone 28. Disc 31 begins to rotate and, with it, shaft 17 from which turntable 10 and the recorder feed are driven. Should the inertia of the turntable and feed mechanism be too great, hub 43 of disc 31 simply rotates about shaft 17 until the force of friction between the two is greater than the torque at that point.

The rotation of the shaft also starts the feed belt moving and as soon as record blank 11 is in place and recorder 12 is properly connected to a source of sound control electrical currents (not shown), recorder 12 may be lowered into engagement with record blank 11 to cut a sound groove. When the record is complete, the recorder may be raised from the blank and the motor stopped, or lever 41 lowered, to stop the turntable.

The friction cone mechanism is a speed reducing mechanism which can be simply designed to provide several values of speed reduction. If properly designed it does not add any speed variations itself and, due to the resilience of the runway, the mass of the turntable and the friction generated between the various bearings and other rubbing surfaces, it will not transmit high frequency speed variations. Thus in combination with a high speed synchronous motor it gives a perfectly uniform speed.

It is understood that this invention is described with reference to a specific structure for the purpose of illustration only and that various modifications thereof are possible without departing from the scope of the invention.

What is claimed is:

1. A multiple speed drive adapted to filter out high frequency oscillations comprising a large rotatable disc, a plurality of resilient runways on a surface of the disc, said runways comprising frusta of cones with apices located on the axis of rotation of the disc, a mass associated with the disc, driving means for the disc comprising small non-resilient cone pulleys adapted to cooperate with the resilient runways on the disc, high speed driving means for the non-resilient cone pulleys whereby periodic variations in speed are made to have a high frequency and selective means for associating one driving cone pulley with one of the runways.

2. A constant speed drive comprising a high speed motor, a non-resilient cone pulley adapted to be driven by said motor, a disc associated with a mass, a resilient surface on the disc comprising a frustum of a cone, a shaft for the disc, said disc being located on the shaft in such a manner that the resilient surface is normally out of contact with the non-resilient cone pulley, a flexible central portion in the disc, and means for deforming the disc to establish contact between the resilient surface and the non-resilient cone pulley.

HENRY C. HARRISON.